United States Patent [19]

Oeming

[11] 4,230,003
[45] Oct. 28, 1980

[54] FEED APPARATUS FOR A LATHE

[76] Inventor: Joseph A. Oeming, 220 Reynick, Saginaw, Mich. 48602

[21] Appl. No.: 5,346

[22] Filed: Jan. 22, 1979

[51] Int. Cl.³ ............................................. B23B 13/00
[52] U.S. Cl. ...................................................... 82/2.7
[58] Field of Search ......................... 82/2.5, 2.7, 3, 8, 9

[56] References Cited

U.S. PATENT DOCUMENTS

| | | | |
|---|---|---|---|
| 1,748,795 | 2/1930 | Roberts | 82/2.7 |
| 3,400,618 | 9/1968 | Steinmetz | 82/2.7 |
| 3,680,413 | 8/1972 | Hiney | 82/2.7 |

FOREIGN PATENT DOCUMENTS

| | | | |
|---|---|---|---|
| 1062522 | 7/1959 | Fed. Rep. of Germany | 82/2.7 |
| 799520 | 4/1936 | France | 82/2.7 |
| 1086242 | 8/1954 | France | 82/2.7 |
| 1373532 | 11/1974 | United Kingdom | 82/2.7 |

Primary Examiner—Harrison L. Hinson

Attorney, Agent, or Firm—Gifford, VenOphem, Sheridan & Sprinkle

[57]  ABSTRACT

A novel apparatus is provided for sequentially feeding elongated workpieces in timed progression to a work performing area of a lathe. The lathe includes suitable means for grasping the ends of the workpiece once positioned within the work performing area and for rotatably driving the workpiece while performing a machining operation on the workpiece. The feed apparatus comprises a conveyor for sequentially moving the workpieces underneath the work performing area so that the workpieces are parallel to the axis of rotation of the lathe driving means but spaced downwardly therefrom. Elevator arms engage and lift a single workpiece to the work performing area whereupon the lathe engages the workpiece and performs the desired machining operation. Upon completion of the machining operation, the elevator arms return the workpiece to the conveyor. The conveyor then moves a subsequent workpiece into position for engagement with the elevator arms.

9 Claims, 6 Drawing Figures

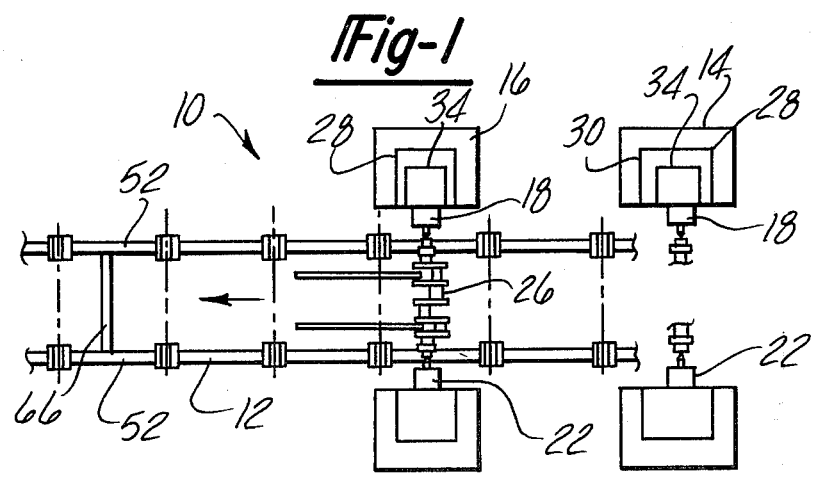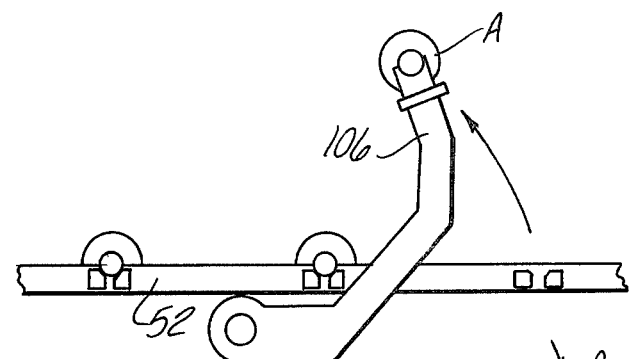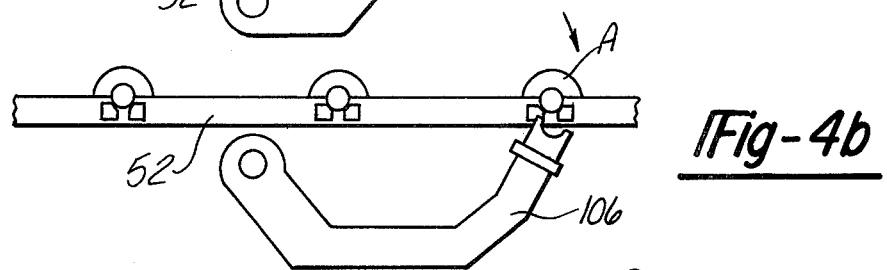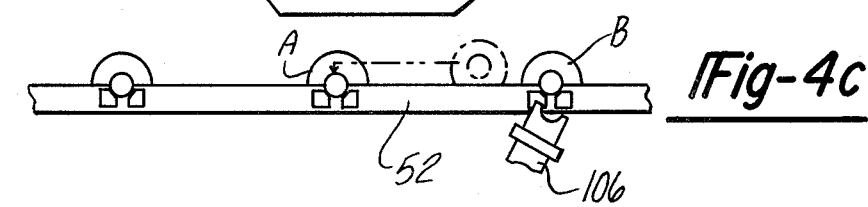

Fig-2

FEED APPARATUS FOR A LATHE

BACKGROUND OF THE INVENTION

I. Field of the Invention

The present invention relates generally to feed devices and, more particularly to such a device for sequentially feeding workpieces to the work performing area of a lathe.

II. Description of the Prior Art

Lathes are used for machining a wide variety of articles of manufacture. Typically the lathe includes a tailstock spindle which clampingly engages one axial end of a workpiece and a headstock spindle which clampingly engages the other axial end of the workpiece. The lathe further includes means for rotatably driving one or both of the spindles so that the workpiece rotates in unison with the spindles while suitable machining means perform the desired machining operation on the workpiece. The machining means can comprise, for example, cutting blades, a grinding wheel, and the like.

In order to completely machine many types of workpieces, for example, crankshafts for internal combustion engines, it has been the previous practice to perform two or more machining operations on sequential lathes in order to obtain the desired final or completed part. For example, conventionally, a crankshaft is initially subjected to a rough turn on a first lathe which rapidly removes stock from the workpiece on all surfaces concentric with the centerline of the workpiece. Thereafter, the crankshaft is moved to a subsequent lathe which performs a rough turning operation on the diameters that are not concentric with the centerline of the workpiece, as is well known in the art. Depending on the type of workpiece, the workpiece can undergo three, four and even more sequential machining operations on different lathes until the desired final part is obtained.

It has been the previous practice to either manually or automatically load and unload the workpieces into the work performing area of the lathe prior to each machining operation from the top or front of the lathe.

Automatic loading and unloading of the lathe from the top or front of the lathe involves a bulky and expensive overhead gantry type loader and unloader. These gantry type devices remove the finished workpiece from the lathe and insert the rough workpiece in the lathe. The gantry loader then transports the workpiece to a lift and carry conveyor located at the end of the lathe. The gantry loader deposits the finished workpiece on the conveyor and picks up a rough workpiece.

The loading and unloading of the workpiece from the top or front of the lathe, however, is disadvantageous due to the high equipment cost involved and these equipment costs are further increased when multiple sequential machining operations are required. Moreover, the actual automatic loading and unloading of the workpiece from the top or front to and from the lathe, respectively, often requires more time than the actual machining operation so that the lathe is utilized very ineffectively and inefficiently. In addition, excessive floor space is reduced.

SUMMARY OF THE PRESENT INVENTION

The present invention overcomes the above mentioned disadvantages by providing a feed apparatus for a lathe which automatically and rapidly sequentially feeds workpieces to the lathe in a simple straightforward manner.

In brief, the apparatus of the present invention comprises a conveyor means for sequentially moving workpieces along a conveyor track underneath and generally parallel to the work performing area of the lathe. Preferably, the conveyor means is a lift-and-carry conveyor which simultaneously moves a plurality of workpieces along a conveyor track in unison with each other and in incremental steps at a predetermined distance. The conveyor track can extend under a plurality of lathes, each having a separate work area, where sequential machining by different lathes of the workpieces is desired.

In order to raise the workpieces from the conveyor track into the work performing area of the lathe, a pair of spaced elevator arms is associated with and underneath the conveyor track at each lathe. When the workpiece is properly positioned on the conveyor track, the elevator arms are activated and engage and raise the workpiece to the work performing area of the lathe. The lathe then engages and performs the desired machining operation upon the workpiece.

Upon completion of the machining operation, the elevator arms again engage the workpiece and lower it back onto the conveyor track. The conveyor is then actuated which moves the finished workpiece toward the next machining station while simultaneously moving a subsequent and unmachined workpiece underneath the lathe work performing area. The elevator arms are then again activated to lift the subsequent workpiece to the lathe work performing area and the above described machining operation is repeated.

The above described arrangement eliminates the bulky and inexpensive overhead gantry type loader and unloader described under prior art. In its place is substituted a simple elevator thereby effecting a considerable savings in equipment cost.

In addition, the use of the elevator reduces loading and unloading time enabling the lathe to operate more efficiently.

By moving the conveyor underneath the lathe considerable savings in floor space is realized.

BRIEF DESCRIPTION OF THE DRAWINGS

A better understanding of the present invention will be had upon reference to the following detailed description when read in conjunction with the accompanying drawing, wherein like referdnce characters refer to like parts throughout the several views, and in which:

FIG. 1 is a partial diagrammatic top elevational view illustrating the apparatus of the present invention and with parts removed for clarity;

FIG. 2 is a side elevational view illustrating the apparatus of the present invention and with parts removed for clarity;

FIGS. 4a–4c are diagrammatic views illustrating the operation of the apparatus of the present invention.

DETAILED DESCRIPTION OF THE PRESENT INVENTION

Figure 2:
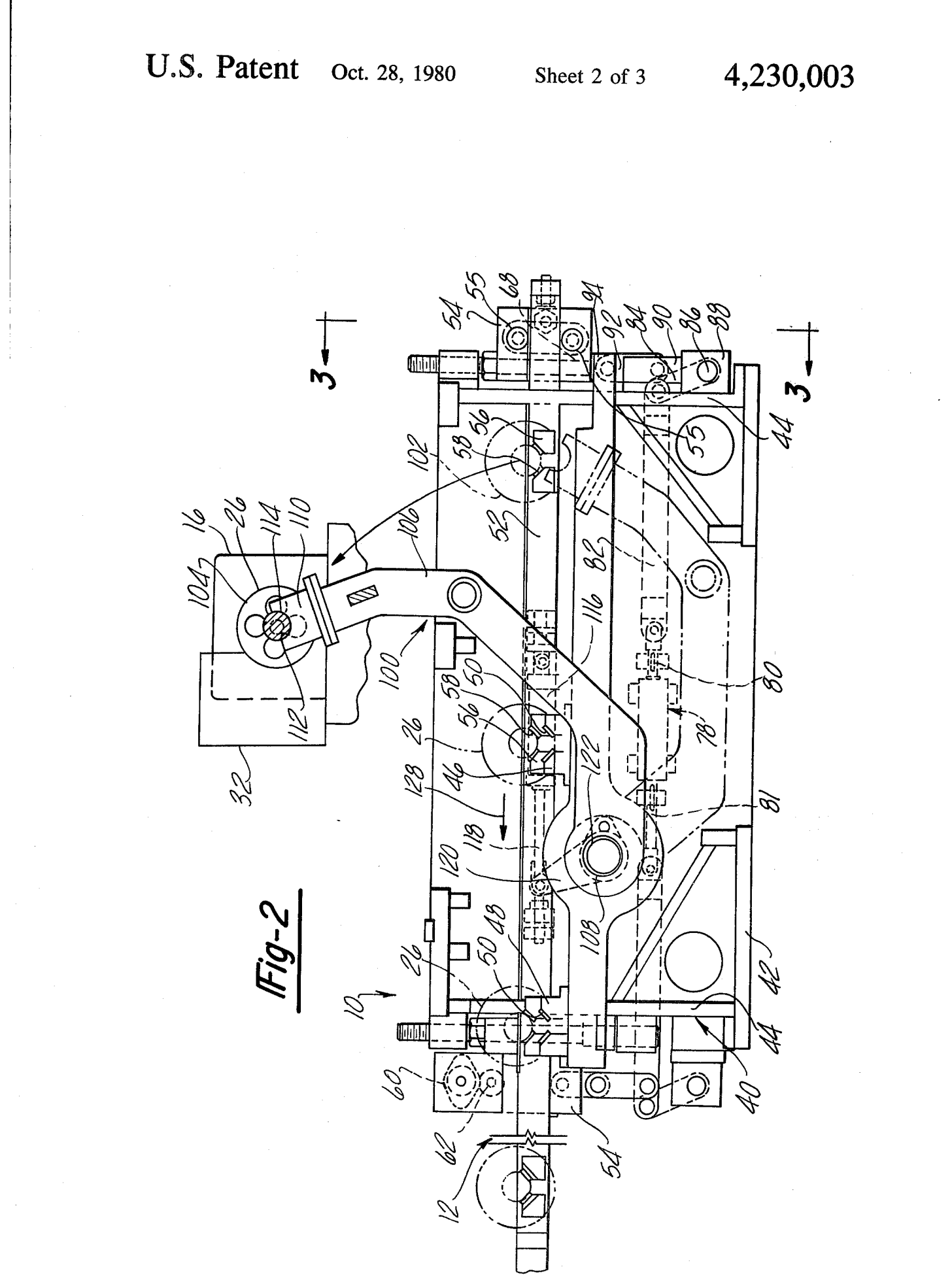
Figure 3:
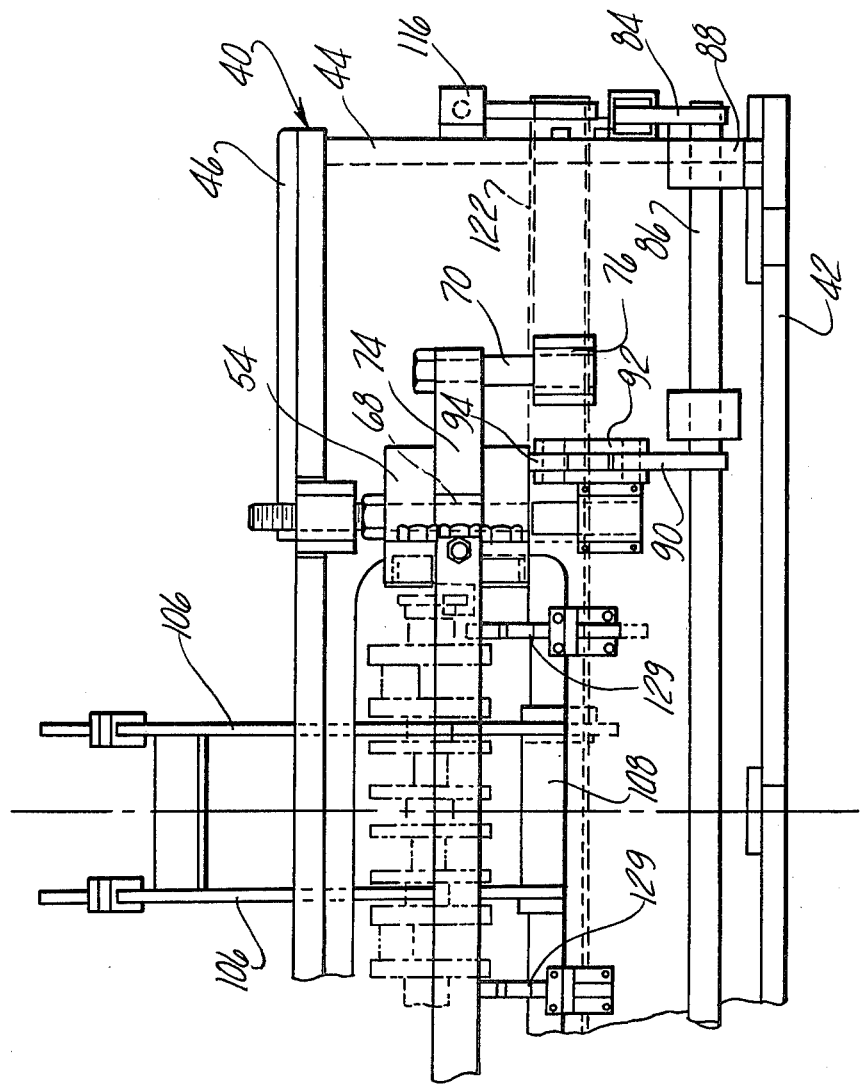
FIG. 3 is a fragmentary end elevational view of the apparatus of the present invention and taken substantially along line 3—3 in FIG. 2.

With reference first to FIG. 1, the feed apparatus 10 of the present invention is thereshown from the top and comprises an elongated conveyor means 12, which will subsequently be described in greater detail, extending along and underneath a first lathe 14 and a second lathe 16. Each lathe 14 and 16 includes a headstock spindle 18 and a tailstock spindle 22 which clampingly engage the axial end of an elongated workpiece or work 26. By way of example only, the work 26 is shown as a crankshaft for an internal combustion engine and, for purposes of definition, when the work 26 is positioned between the headstock and tailstock spindles of a particular lathe, the work 26 is at the work station for that lathe. Each lathe 14 and 16 further includes means 28 for rotatably driving the work 26 in the work station while machining means 32 (FIG. 2) associated with each lathe 14 and 16 perform a machining operation on the work 26. The machining means 32 can, for example, comprise cutters, a grinding wheel or wheels and the like although for the example shown, the machining means 32 will typically comprise one or more turning tools for turning the crankpins and bearing journals on the crankshaft.

With reference now to FIGS. 2 and 3, the apparatus 10 of the present invention is thereshown in greater detail and comprises a frame 40 having a base 42 secured to a ground support surface by means not shown. The frame 40 further includes vertical supports 44.

Still referring to FIGS. 2 and 3, the conveyor means 12 is a lift-and-carry conveyor that extends longitudinally through and is supported by the apparatus frame 40. The conveyor means 12 further includes a pair of laterally spaced stationary workpiece supports 46 (only one of which is shown) secured to the stationary rails 129 which is secured to frame 40 and a substantially identical pair of stationary workpiece supports 48 (only one of which is shown) which are laterally spaced from each other and longitudinally spaced a predetermined distance from the first supports 46. Each of the supports 46 and 48 includes an upwardly facing V-shaped notch 50 which engages and supports one end of the work 26. Thus, the supports 46 engage the work 26 at opposite ends and support it substantially parallel to the lathe work performing area while the supports 48 likewise engage and support a subsequent work 26 at a position longitudinally spaced from the supports 46.

A pair of elongated laterally spaced parallel rails 52 extend longitudinally through the frame 40. The rails 52 are longitudinally slidably supported by guides 54 having rollers 55 at each longitudinal end of the frame 40. Each rail 52 includes a plurality of longitudinally spaced workpiece supports 56, each having an upwardly facing V-shaped notch 58 spaced therealong at intervals corresponding to the distance between the first supports 46 and 48. Like the supports 46 and 48, the supports 56 on the rails 52 engage and support opposite ends of the work 26. In addition, the rails 52 are laterally spaced from the stationary supports 46 and 48 so as not to interfere with them.

Longitudinal sliding movement of the rails 52 is achieved by means of a motor 60 secured to one guide 54. The motor 60 rotatably drives a pinion 62 which meshes with a gear rack 64 secured to one of the rails 52. Activation of the motor 60 in one direction thus longitudinally moves the rails 52 in one longitudinal direction while rotation of the motor 60 in the opposite direction moves the rails 52 in the opposite direction. The rails 52 are secured together by conventional means, such as cross members 66 (FIG. 1), to insure the movement of the rails 52 in unison with each other.

Still referring to FIGS. 2 and 3, the guides 54 are both vertically slidably mounted on vertical guide tubes 68 which are secured to the frame 40. An auxiliary vertically extending guide pin 70 is also secured to a laterally outwardly extending portion of the guide 54. The guide pin 70 is slidably received through a journal 76 secured to the frame 40 to insure even vertical sliding movement of the guides 54 and, thus, of the rails 52.

The rails 52 are movable between an upper and lower position and are illustrated in FIG. 2 in their upper position. With the rails 52 in their upper position, the rail workpiece supports 56 are positioned above the stationary supports 46 and 48 so that the rails 52 lift the work 26 up from the stationary supports 46 and 48. With the rails 52 in their upper position, activation of the motor 60 will longitudinally shift the work 26 on the conveyor means 12. Conversely, with the rails 52 in their lowermost position, the rail work supports 56 are positioned below the stationary supports 46 and 48 so that longitudinal displacement of the rails 52 will not longitudinally move the work 26 since the work 26 instead is supported by the stationary supports 46 and 48.

A double rod cylinder arrangement 78 is secured to the frame 40 for vertically moving the guides 54, and thus, the rails 52, between the upper and lower position. One rod 80 of the cylinder piston arrangement 78 is connected to one end of a connecting rod 82 so that extension and retraction of the rod 80 likewise longitudinally extends and retracts the rod 82. The other end of the rod 82 is connected to one end of a link 84 having its other end secured to a laterally extending rotatable shaft 86. The shaft 86 is rotatably mounted within a journal 88 secured to the frame 40 so that extension and retraction of the piston rod 80 reciprocally rotates the rod 86 between a first and second rotational position.

A further link 90 is also rigidly secured at its lower end at a position spaced laterally inwardly from the first link 84 (FIG. 3), and thus, pivots in unison with the shaft 86. The upper end of the link 90 is pivotally connected to a lower end of a further link 92 having its upper end in turn pivotally connected to an extension 94 on the guide 54. Consequently, extension of the piston rod 80 from the position illustrated in FIG. 2 will rotate the shaft 86 with its attached link 90 and draw the guides 54 with their connected rails 52 to the lower position. Conversely, retraction of the rod 80 within the cylinder 78 with the guides 54 in their lower position rotates the link 90 and returns the guides 54 to their upper position.

Although not shown in FIG. 3, a pair of guides 54 are associated with each longitudinal end of the apparatus 10 and, consequently, the shaft 86 extends substantially entirely laterally across the frame 40 to insure vertical movement of the guides 54 in unison with each other. In addition, the second rod 81 of the piston cylinder arrangement 78 extends in the opposite direction from the rod 80 and vertically moves the guides 54 at the other longitudinal end of the frame 40 in substantially the identical manner and with the same components as has been already described. Therefore, for the sake of brevity, repetition thereof will be omitted, it being understood that the immediately preceding description is equally applicable to the actuation or vertical displacement of the guides 54 at the opposite longitudinal end of the frame 40.

Still referring to FIGS. 2 and 3, the feed apparatus 10 according to the present invention comprises lifting means 100 for lifting the work 26 from a lift position 102 on the conveyor means 12 and to the work station 104 for the lathe 16. As shown in FIG. 2, the lift position 102 is spaced a predetermined distance from the next adjacent workpiece 26 and with the rails 52 in their uppermost position.

The lifting means 100 further comprises a pair of spaced and parallel somewhat arcuate elevator arms 106. The arms 106 are rotatably mounted by a bearing means 108 extending laterally across and secured to the frame 40 and are movable from a lower position illustrated in phantom line in FIG. 2 in which the elevator arms 106 are positioned entirely below the conveyor track, and an upper position illustrated in solid line in which the free end 110 of the elevator arms 106 position the work 26 in the work station 104. An arcuate abutment surface 112 at the free end 110 of the elevator arms 106 engages a like shaped surface 114 on the work 26 to prevent the work 26 from falling from the arms 106. As should be apparent, counterclockwise rotation (FIG. 2) of the arms 106 engages a work 26 at position 102 and moves the work to the work station 104 while, conversely, clockwise rotation of the arms 106 returns the work 26 from the work station 104 and to the rail supports 56 at the lift position 102.

A second hydraulic cylinder 116 is secured to one side of the frame 40 for selectively moving the elevator arms 106 between their upper and lower position. To achieve this, the hydraulic cylinder 116 includes a selectively extendable and retractable rod 118 pivotally secured at its free end to an actuating lever 120. The other end of the lever 120 is secured to a laterally extending shaft 122 which is rotatably mounted within the bearing means 108. The elevator arms 106 are secured to the shaft 122 so that extension of the cylinder rod 118 rotates the shaft 122 and the attached elevator arms 106 to their upper position while, conversely, retraction of the cylinder rod 118 rotates the shaft 122 and the attached elevator arms 106 in the opposite direction to return the elevator arms 106 to their lowermost position.

The component parts of the feed device 10 of the present invention having been described, the sequence of operation is as follows with particular reference to FIGS. 2 and 4a-4c. With the elevator arms 106 in their lowermost position the rails 52 are moved to their upper position by the cylinder 78 and shifted leftwardly by the motor 60, thus, longitudinally moving a work 26 from the right as viewed in FIG. 2 and to the lift position 102. Actuation of the cylinder 116 then raises the arms 106 which engage the work 26 at position 102 and move it to the work station 104, shown in FIG. 4a, whereupon the lathe 16 engages the work 26 to perform the machining operation. Prior to the machining operation, however, the arms 106 are returned to their lowermost position by retraction of the piston rod 118.

During the machining operation, the rails 52 are moved downwardly and shifted rightwardly which deposits already completed workpieces 26 upon the stationary supports 46 and 48 and after completion of rightward movement rails 52 are raised. Upon completion of the machining operation with the rails 52 in their rightmost position and up, the arms 106 are again moved to their upper position by the cylinder 116 in order to engage and return the completed work 26 to the lift position 102 upon release of the lathe clamping means, as shown in FIG. 4b. After the arms 106 deposit the completed work 26 at the lift position 102, the rails 52 are moved leftwardly in their upper position by the motor 60, as shown in FIG. 4c, which brings a new work from the right and to the lift position 102. The above described process is then repeated.

It can, therefore, be seen that the work 26 is sequentially moved in the direction of arrow 128 (FIG. 2) along the conveyor means 12 while the work moving into the lift position 102 is automatically moved up to and returned from the lathe work station 104.

Although FIGS. 2 and 3 illustrate only one feed apparatus 10 according to the present invention it will be understood that each lathe includes separate elevator arms 106 and their associated components for moving the work 26 from the conveyor means 12 and into the lathe work station 104. However, as is best shown in FIG. 1, the conveyor means 12 defines a conveyor track which can move underneath a plurality of sequential lathes 14 and 16. In the event of sequential lathes, the elevator arms 106 and rails 52 all move in synchronism with each other.

From the foregoing it can be seen that the feed mechanism 10 according to the present invention provides a novel means whereby workpieces can be sequentially fed by machine action to the work performing area of a lathe thereby eliminating the previously required gantry type loading and unloading of the workpiece onto and off from the lathe. This is particularly advantageous where sequential machining operations are required each of which have previously required bulky loading and unloading of the workpiece from each lathe.

Moreover, since the work 26 can be rapidly moved to the lathe by the elevator arms 106 and clamped into position, the lathe 16 can be employed much more effectively and efficiently by elimination of the previous known delays caused by gantry loading and unloading the lathes.

Having described my invention, however, many modifications thereto will become apparent to those skilled in the art to which it pertains without deviation from the spirit of the invention as defined by the scope of the appended claims.

I claim:

1. Apparatus for sequentially feeding elongated workpieces to work station of a lathe, said lathe having means for engaging and rotatably driving one workpiece about its longitudinal axis in said work station and means for machining the workpiece in the work station, said apparatus comprising:

conveyor means for sequentially moving said workpiece underneath the work station of at least one lathe; and means for sequentially moving said workpieces from said conveyor means and to said work station whereupon said lathe engages and machines said workpiece, said moving means being further operable to return said workpiece from the work station and to the conveyor means upon the completion of the machining operation;

wherein said apparatus further includes a frame and wherein said conveyor means is a lift and carry conveyor means and further comprises a pair of spaced and parallel rails having means for supporting workpieces laterally across the rails at predetermined longitudinal intervals, at least two pair of laterally spaced stationary workpiece support members secured to said frame and longitudinally spaced said predetermined distance from each other, means for longitudinally reciprocally moving said rails said predetermined distance, and means for vertically reciprocally moving said rails between an upper and lower position, said rail workpiece support means being positioned above said stationary support members in said upper position and being positioned below said stationary support members in said lower position.

2. The invention as defined in claim 1 and further comprising a pair of guides through which the rails longitudinally extend, said guides being longitudinally spaced from each other and having means for longitudinally slidably supporting said rails, means for vertically slidably connecting said guides to said frame, and wherein said vertical moving means operatively engages and vertically moves said guides in unison with each other.

3. The invention as defined in claim 2 wherein said longitudinal moving means comprises a motor means carried by one of said guides, said motor means being operatively connected to said rails.

4. The invention as defined in claim 1 wherein said sequential moving means further comprises a pair of elevator arms pivotally secured at one end to said frame and means for pivoting said elevator arms between an upper and a lower position, the other end of the elevator arms having means for lifting said workpiece at two longitudinally spaced points along said workpiece and wherein in said upper position said elevator arms position the workpiece in said work station while in said lower position said elevator arms position the workpiece on the conveyor means.

5. The invention as defined in claim 1 wherein said conveyor means sequentially transports said workpieces below the work station of at least two lathes, each lathe having said means for sequentially moving one workpiece to its work station whereby said lathes perform sequential machining on said workpieces.

6. The invention as defined in claim 1 wherein said sequential moving means further comprises a pair of spaced arms pivotally secured to said frame at a first end about an axis substantially normal to the direction of travel of the conveyor means, means formed on a second end of each arm for engaging and lifting one workpiece from the conveyor means, said second end of the arms being movable between an upper and lower position upon rotation of the first end of the arms between a first and second rotational position.

7. The invention as defined in claim 6 wherein the second end of the arms includes a channel formed thereacross which engages and receives a like shaped surface on the workpiece as the arms are moved from said lower to said upper position.

8. Apparatus for sequentially feeding elongated workpieces to a work station of a lathe, said lathe having means for engaging and rotatably driving one workpiece about its longitudinal axis in said work station and means for machining the workpiece in the work station, said apparatus comprising:

conveyor means for sequentially moving said workpiece underneath the work station of at least one lathe; and means for sequentially moving said workpieces from said conveyor means and to said work station whereupon said lathe engages and machines said workpiece, said moving means being further operable to return said workpiece from the work station and to the conveyor means upon the completion of the maching operation;

wherein said apparatus further includes a frame and wherein said conveyor means further comprises a pair of spaced and parallel rails extending beneath said work station and having means for supporting workpieces laterally thereacross;

said moving means further comprising at least one elongated elevator arm pivotally secured at one end to said frame and having means formed at its other end for engaging a workpiece on said rails, means for pivoting said elevator arm between a lower position and an upper position so that in said lower position said elevator arm is positioned entirely beneath said rail and so that in said upper position said elevator arm extends between said parallel rails and positions said workpiece at said work station.

9. The invention as defined in claim 8 and further comprising a pair of spaced and parallel elevator arms pivotally secured at one end to the frame and having means at their other ends for engaging said workpiece at longitudinally spaced positions, wherein said pivoting means pivots said elevator arms in unison with each other and so that in said upper position, both of said elevator arms extend between said rails.

* * * * *